M. MILLION.
SPRING WHEEL.
APPLICATION FILED JULY 28, 1916.
1,284,416.
Patented Nov. 12, 1918.
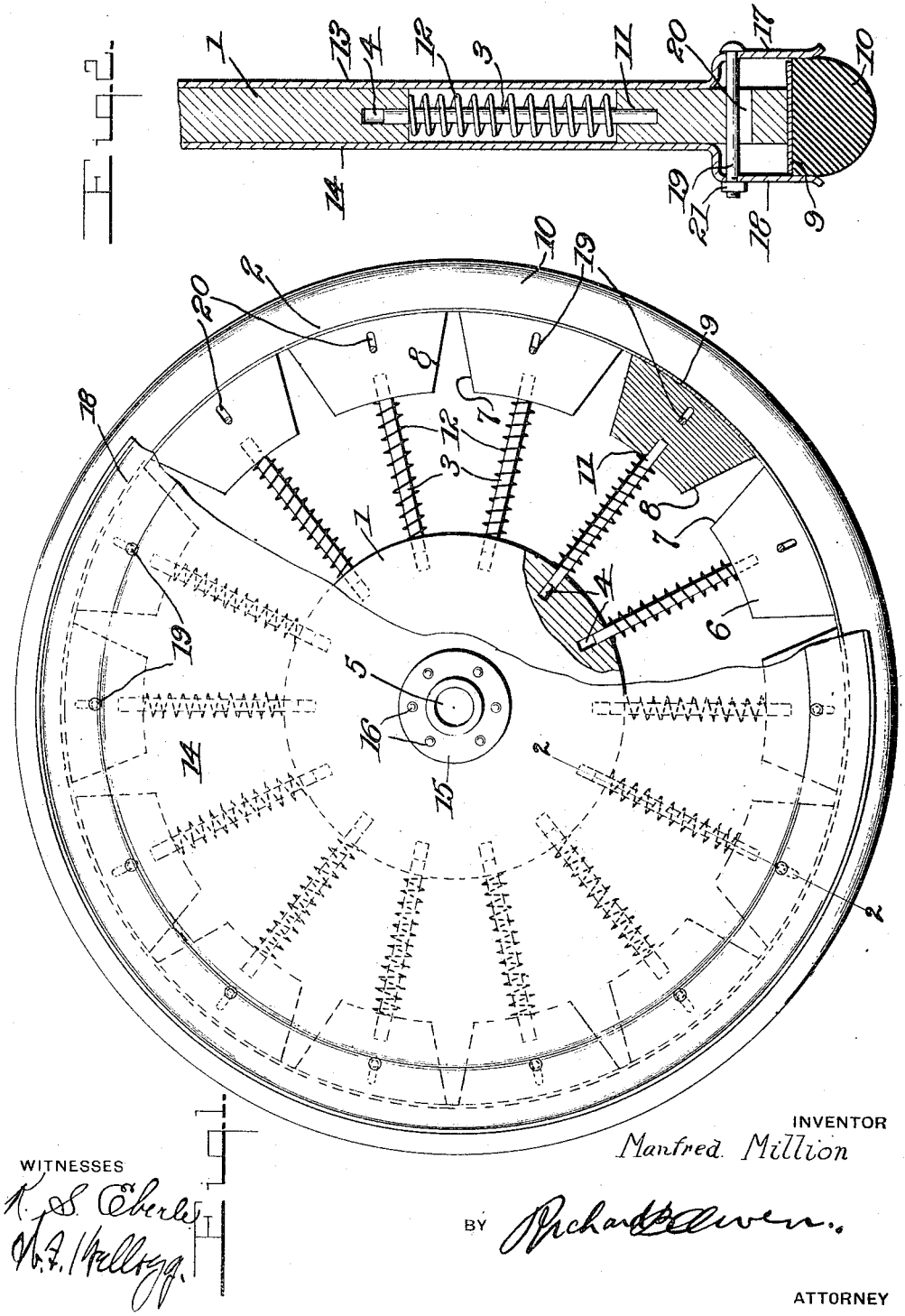
INVENTOR
Manfred Million
WITNESSES
BY
ATTORNEY

UNITED STATES PATENT OFFICE.

MANFRED MILLION, OF ADRIAN, MICHIGAN, ASSIGNOR OF ONE-THIRD TO ORRIN J. LINENDOLL, OF DENVER, COLORADO.

SPRING-WHEEL.

1,284,416.     Specification of Letters Patent.     Patented Nov. 12, 1918.

Application filed July 28, 1916. Serial No. 111,861.

*To all whom it may concern:*

Be it known that I, MANFRED MILLION, a citizen of the United States, residing at Adrian, in the county of Lenawee and State of Michigan, have invented certain new and useful Improvements in Spring-Wheels, of which the following is a specification.

My invention relates to spring wheels.

The invention has more especial reference to a wheel of the character stated which is provided with a plurality of yieldably mounted spokes, whereby the rim of the wheel will be resiliently supported, whereby shocks or jolts as may be imparted to the wheel will be absorbed by the same, hence preventing the jolting of the vehicle.

Another important characteristic of the present invention resides in the novel construction and formation of the wheel rim, the same comprising a plurality of independently movable sections, thereby imparting a greater flexibility thereto.

The invention also embraces a novel means whereby the working parts of the wheel may be housed, the said means comprising a plurality of disks, which disks are affixed to the opposite sides of the wheel structure, in such a manner as to permit uninterrupted movement of the various sections as constituting the rim.

A further object of the invention is to provide a wheel of the character mentioned, in which the parts thereof are closely assembled and combined, thereby taking up a minimum amount of space, also, a construction which is efficient in operation, strong and durable in use.

Other improvements and novel details in the construction and arrangement of the various parts of the construction will be brought out more in detail in the description to follow, which for a clear understanding of the invention, should be considered in connection with the accompanying drawings, forming a part hereof, and wherein is disclosed for the purpose of illustration, a convenient and satisfactory embodiment of the invention.

In the drawings:—

Figure 1 is a side elevation of my improved spring wheel, with parts thereof broken away and other parts in section, and Fig. 2 is a transverse section taken on the line 2—2 of Fig. 1.

Referring now more particularly to the drawings, wherein like reference characters designate corresponding parts throughout the several views, it may be stated that my improved construction comprises a hub 1, a rim indicated in its entirety by the numeral 2, which rim is efficiently supported in spaced relation from the hub 1, by means of a plurality of yieldable spokes 3, the construction of which will be more fully hereinafter entered into. With more especial reference to the present improvements, the hub 1 comprises a substantially circular block having a plurality of radially extending openings or pockets 4 formed in the peripheral surface thereof. A suitable bearing opening 5 is arranged concentrically of the hub 1 and provides for means whereby the wheel structure as a whole may be arranged upon a suitable axle. The rim 2 comprises a plurality of independently movable blocks 6, the adjacent side portions of which are beveled or inclined as at 7 and 8, whereby said blocks may move independently of each other without any binding action. A second rim or felly 9 comprising a circular band arranged peripherally of the circular rim 2 is provided and affords means whereby a cushioned tire 10, formed of rubber or other similar matter may be received by the wheel.

A plurality of radially extending spokes as above referred to by the numeral 3, are interposed between the sectional rim 2 and the circular hub block 1, the outer extremities thereof being received within openings 11 formed within the inner faces of the blocks 6, while the remaining ends thereof are movably received within the pockets 4 arranged in the hub block 1. A plurality of expansible coiled springs 12 are arranged about the spokes 3 and have the opposite extremities thereof bearing upon the adjacent faces of the hub block 1 and the movable blocks 6. As will be obvious, these expansible springs will serve to normally maintain the movable blocks 6 of the sectional rim 2 in outermost position, consequently permitting the same to move inwardly when subjected to pressure.

In order to provide for means whereby the certain parts of the wheel structure may be housed, I arrange upon the opposite sides thereof, cover plates, comprising circular disks 13 and 14, the said disks being provided with concentrically arranged openings, complemental to the opening 5 as arranged within the hub block 1, and carry thereupon adjacent said opening, collars 15, which are secured thereto through the medium of screws or other suitable fasteners as at 16. Circumferentially offset portions 17 and 18 are arranged adjacent the marginal edges of said disks 13 and 14 and provide for means whereby the inner portion of the cushioned tire 10 will be received therebetween. Bolts 19 are passed through alined openings arranged in said offset portions 17 and 18 and through elongated slots 20, which slots, are arranged within the movable blocks 6, and are secured therein by means of the usual locking nuts, generally indicated as 21. Thus, it will be noted, that the outer portions of the disks 13 and 14 will be at all times maintained in close engagement with the cushioned tire 10 and hence, will prevent displacement of the movable blocks 6.

In operation and assuming that the wheel is applied to the axle of a vehicle, it will be apparent that when a portion of the cushioned tire 10 is subjected to any pressure, the same will not only be cushioned by its inherent resiliency but also, by means of the yieldable mounting of the spokes 3 and the sectional construction of the rim 2, which rim will permit relative movement of its various sections, thus, imparting a greater flexibility thereto. The movable blocks 6 as constituting the sectional rim 2 will be permitted to move radially by means of the elongated slots 20 as arranged therein, it being noted that the connecting bolts 19, as engaged with the offset portions 17 and 18 of the disks 13 and 14, are received therethrough.

While I have herein disclosed one special embodiment of the invention, it will be apparent to persons skilled in the art, that changes may be made in the construction and arrangement of parts without departing from the spirit of the invention as may be comprehended in the hereto appended claim.

Having thus described the invention, what is claimed is:—

In a spring wheel of the class described, the combination of a central circular hub block, said hub block having radiating pockets formed therein, reciprocally mounted spokes extending into said pockets, independently movable blocks carried upon the outer ends of said spokes, the adjacent ends of said blocks being beveled to permit said blocks to move independently of each other, springs carried upon said spokes and bearing upon said blocks for urging the same outwardly, circular disks positioned upon said hub block and bearing upon the side surfaces of said movable blocks for holding the same in alinement with each other, said movable blocks having elongated slots, bolts carried by said disks and projecting through said slots, for limiting the movement of said blocks inwardly or outwardly, a band positioned upon said blocks, and a cushion tire carried upon said band, said band constituting a continuous support for the tire.

In testimony whereof I affix my signature in presence of two witnesses.

MANFRED MILLION.

Witnesses:
 August G. Mauhes,
 Joseph A. Kaiser.

Copies of this patent may be obtained for five cents each, by addressing the "Commissioner of Patents, Washington, D. C."